(12) United States Patent
Jing et al.

(10) Patent No.: US 7,627,571 B2
(45) Date of Patent: Dec. 1, 2009

(54) EXTRACTION OF ANCHOR EXPLANATORY TEXT BY MINING REPEATED PATTERNS

(75) Inventors: Feng Jing, Beijing (CN); Kefeng Deng, Beijing (CN); Lei Zhang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 68 days.

(21) Appl. No.: 11/278,289

(22) Filed: Mar. 31, 2006

(65) Prior Publication Data

US 2007/0239710 A1      Oct. 11, 2007

(51) Int. Cl.
G06F 17/30      (2006.01)
(52) U.S. Cl. .............................. 707/6; 704/221; 715/200
(58) Field of Classification Search .................... 707/6; 715/200; 704/221
See application file for complete search history.

(56) References Cited

U.S. PATENT DOCUMENTS

| | | | | | |
|---|---|---|---|---|---|
| 5,477,451 | A | * | 12/1995 | Brown et al. ................... | 704/9 |
| 5,708,825 | A | * | 1/1998 | Sotomayor .................. | 715/205 |
| 5,768,603 | A | * | 6/1998 | Brown et al. ................... | 704/9 |
| 5,799,268 | A | * | 8/1998 | Boguraev ....................... | 704/9 |
| 5,805,832 | A | * | 9/1998 | Brown et al. ................... | 711/1 |
| 6,212,494 | B1 | * | 4/2001 | Boguraev ....................... | 704/9 |
| 6,426,751 | B1 | * | 7/2002 | Patel et al. ................... | 345/468 |
| 6,664,972 | B2 | * | 12/2003 | Eichel et al. ................. | 345/582 |
| 6,886,010 | B2 | * | 4/2005 | Kostoff .......................... | 707/3 |
| 6,931,397 | B1 | * | 8/2005 | Sundaresan .................... | 707/5 |
| 6,965,900 | B2 | * | 11/2005 | Srinivasa et al. ............ | 707/102 |
| 2004/0015909 | A1 | * | 1/2004 | Cho et al. .................... | 717/143 |
| 2004/0078362 | A1 | * | 4/2004 | Kim et al. ...................... | 707/3 |
| 2005/0066269 | A1 | * | 3/2005 | Wang et al. .................. | 715/513 |
| 2006/0059173 | A1 | * | 3/2006 | Hirsch et al. ................ | 707/100 |
| 2006/0161543 | A1 | * | 7/2006 | Feng et al. ..................... | 707/5 |
| 2007/0085716 | A1 | * | 4/2007 | Bar-Yossef et al. ........... | 341/87 |
| 2007/0219980 | A1 | * | 9/2007 | Songfack ....................... | 707/5 |

OTHER PUBLICATIONS

Amitay, Einat et al., "Automatically Summarising Web Sites—Is There a Way Around it?," 2000, ACM, pp. 173-179.*
Liu, B. et al. "Mining Data records in Web Pages," SIGKDD '03, Aug. 24-27, 2003, Washington, DC, pp. 1-6.*
Liu, B. et al. "Mining Data Records in Web Pages," SIGKDD '03, Aug. 24-27, 2003, Washington, DC (6 pages).
Baeza-Yates, R. "Algorithms for string matching: A survey". Data Structuring Group. Department of Computer Science, University of Waterloo. *ACM SIGIR Forum*, 23(3-4):34-58, 1989.

* cited by examiner

*Primary Examiner*—Shahid A Alam
*Assistant Examiner*—Alexandria Y Bromell
(74) *Attorney, Agent, or Firm*—Perkins Coie LLP

(57) ABSTRACT

A method and system for identifying explanatory text for a referenced web page based on a reference to the referenced web page contained in a repeated pattern of a referencing web page is provided. An anchor explanatory text ("AET") system uses the hierarchical organization of the web page to identify a repeated pattern of hierarchical elements that contain references to other display pages. After the AET system identifies a repeated pattern, it identifies the dominant reference or anchor within each occurrence of the pattern. The AET system uses the explanatory text surrounding a dominant anchor as a description of the referenced web page.

20 Claims, 18 Drawing Sheets

200 {
- Albuquerque-Santa Fe – http://www.albuquerque-santafe.feb.gov/ ~201
- Atlanta, GA – http://r4.gsa.gov/febatlanta.htm ~201
- Baltimore, MD – http://www.baltimorefeb.org/
- Buffalo, NY – http://www.buffalo.feb.gov/
- Boston, MA – http://r1.1k.gsa.gov/gbfeb
- Chicago, IL – http://www.chicago.feb.gov/
- Cincinnati, OH – http://www.gcfeb.com/
- Cleveland, OH – http://www.grc.nasa.gov/WWW/OHR/FEB/
- Dallas – Ft. Worth, TX – http://www.epa.gov/earth1r6/6md/feb/index.htm
- Denver, CO – http://www.denver.feb.gov/
- Honolulu-Pacific, HI – http://www.honolulu-pacific.feb.gov/
- Houston, TX – http://www.houston.feb.gov/
- Kansas City, MO – http://www.kcfeb.gsa.gov/
- Los Angeles, CA – http://www.losangeles.feb.gov/

*FIG. 2*

Confirmed Business Track Speakers

Tuesday 23rd May 2006

Creating Successful Web based Business

Mike Harris
Executive vice chairman, founder, Egg PLC

Patrick Sheehan
3i Venture Capital Partner

Tao Yang
Chief Scientist and Senior Vice President, Ask Jeeves

Impact of the Web on Business

Tim Faircliff
General Manager of digital media business, Reuters

Nick Baker
Chief Strategy Officer for Reed Elsevier Group

Wednesday 24th May 2006

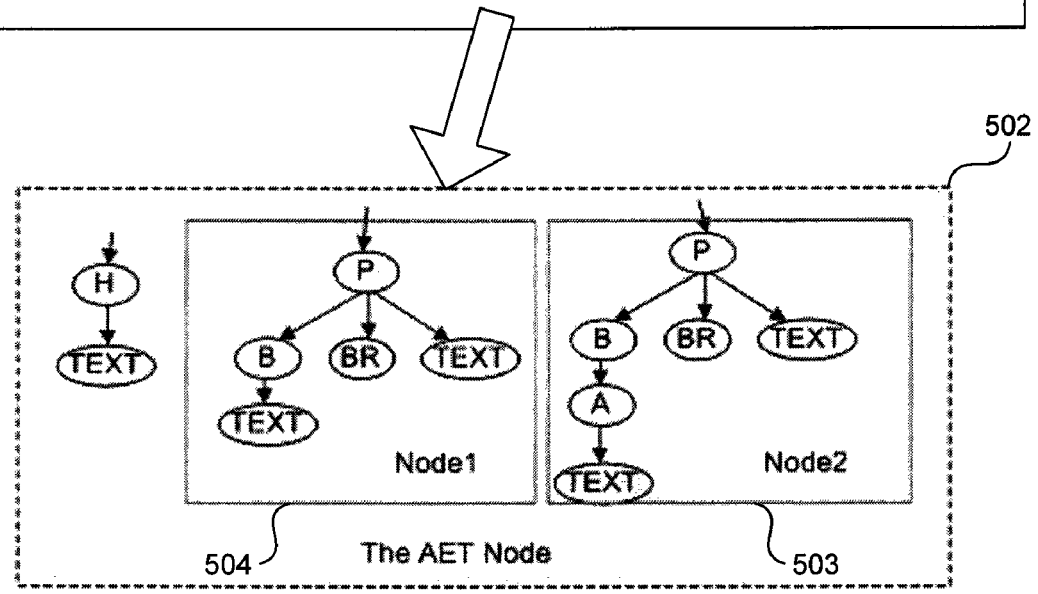

*FIG. 5*

EXTRACTION OF ANCHOR EXPLANATORY TEXT BY MINING REPEATED PATTERNS

BACKGROUND

The Internet allows users to access millions of electronic documents, such as electronic mail messages, web pages, memoranda, design specifications, electronic books, and so on. Because of the large number of documents, it can be difficult for users to locate documents of interest. To locate a document, a user may submit search terms to a search engine. The search engine identifies documents that may be related to the search terms and then presents indications of those documents as the search result. When a search result is presented, the search engine may attempt to provide a summary of each document so that the user can quickly determine whether a document is really of interest. Some documents may have an abstract or summary section that can be used by the search engine. Many documents, however, do not have abstracts or summaries. The search engine may automatically generate a summary for such documents. The usefulness of the automatically generated summaries depends in large part on how effectively a summary represents the main concepts of a document.

Many traditional information retrieval summarization algorithms have been adapted to automatically generate summaries of web pages from their content. For example, Luhn proposed an algorithm that calculates the significance of a sentence to a document based on keywords of the document that are contained within the sentence. Luhn's algorithm selects the sentences with the highest significance to form the summary of the document. As another example, latent semantic analysis ("LSA") algorithms generate an LSA score for each sentence of a document using singular value decomposition. The sentences with the highest score are selected to form the summary of the document. Unfortunately, the summaries generated by the adaptation of these conventional algorithms to web pages are not particularly accurate summaries of the web pages. The main reason for the inaccuracies in the summaries may be that many web pages contain content directed to different topics (e.g., different news articles and advertisements). Many conventional algorithms, in contrast, were designed to generate a summary of a document having a primary topic.

More recent algorithms use the hyperlink structure of the web to generate more accurate summaries of web pages. In particular, many of these techniques use the content of the web pages that link to a web page to generate a summary for that web page. The underlying assumption is that a web page author who includes a link in their web page is likely to provide an accurate (albeit possibly short) summary of the content of a referenced web page. These hyperlink-based algorithms may use the text of the hyperlink itself and the text surrounding the hyperlink to generate a summary. Some algorithms that use the text surrounding the hyperlink may extract a certain number of words (e.g., 25) before and after a hyperlink or may extract a complete sentence or paragraph surrounding a hyperlink.

These hyperlink-based or anchor-based algorithms, however, have difficulty distinguishing hyperlinks with surrounding text that accurately describes the referenced web page from those that do not. For example, a web page may contain the sentence "Today, I visited the <link>White House</link> with my mother." The text surrounding this link, however, provides an inaccurate description of a web page for the White House. As a result, these hyperlink-based algorithms often generate summaries that are inaccurate.

SUMMARY

A method and system for identifying explanatory text for a referenced web page based on a reference to the referenced web page contained in a repeated pattern of a referencing web page is provided. An anchor explanatory text ("AET") system uses the hierarchical organization of the web page to identify a repeated pattern of hierarchical elements that contain references to other web pages. After the AET system identifies a repeated pattern, it identifies the dominant reference or anchor within each occurrence of the pattern. The AET system uses the explanatory text associated with (e.g., surrounding) a dominant anchor as a description of the referenced web page. If an occurrence has only one anchor, then that anchor is the dominant anchor. If, however, an occurrence has multiple anchors, then the AET system attempts to identify which of the multiple anchors is the dominant anchor. If the AET system cannot identify a dominant anchor within an occurrence, then the AET system may consider the text surrounding the anchors as a description of the referenced web page that cannot be verified as accurate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 illustrates a list of Federal Executive Boards home pages as a repeated pattern.

FIG. 5 illustrates the condition that the second criterion is designed to identify.

DETAILED DESCRIPTION

A method and system for identifying explanatory text for a referenced display page based on a reference to the referenced display page contained in a repeated pattern of a referencing display page is provided. In one embodiment, an anchor explanatory text ("AET") system uses the hierarchical organization of a web page to identify a repeated pattern of hierarchical elements that contain references to other web pages. For example, a web page that contains a list of cameras may have a list element for each camera that each contains the same sub-elements (e.g., make, model, description, rating, price, and URL to a detailed page). Each list element is an occurrence of a repeated pattern. The AET system may use a mining data records ("MDR") based algorithm to identify a repeated pattern. After the AET system identifies a repeated pattern, it identifies the dominant reference or anchor within each occurrence of the pattern. The AET system uses the explanatory text associated with (e.g., surrounding) a dominant anchor as a description of the referenced web page. If an occurrence has only one anchor, then that anchor is the dominant anchor. If, however, an occurrence has multiple anchors, then the AET system attempts to identify which of the multiple anchors is the dominant anchor. If the AET system cannot identify a dominant anchor, then the AET system may consider the text surrounding the anchors as a description of the referenced web page that cannot be verified as accurate. The explanatory text identified by the AET system may be used by various applications such as for web page summarization, focused crawling, query refinement, and language translation. By relying on anchors within repeated patterns, the AET system extracts anchor explanatory text that, in general, provides a description of a referenced web page that is less likely to be inaccurate than previous techniques that do not rely on repeated patterns.

Figure 1:
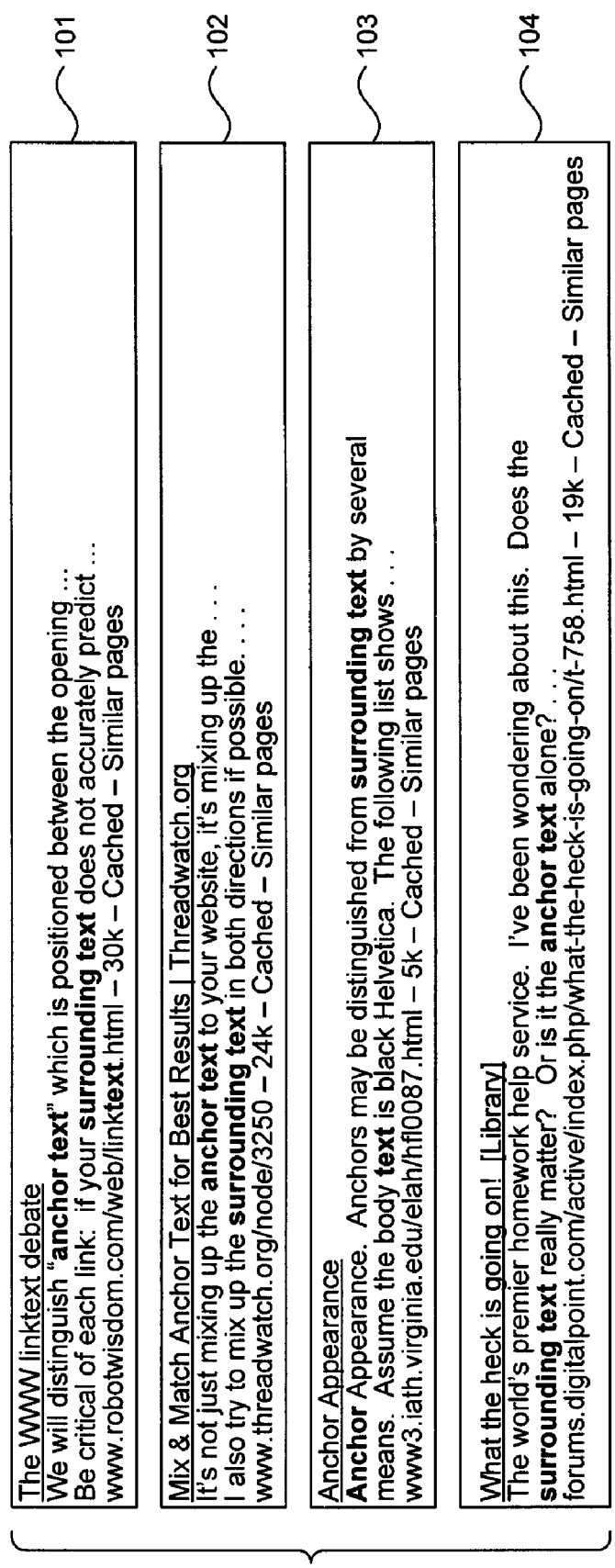
FIG. 1 illustrates a search result with a repeated pattern.

FIGS. 1 and 2 contain examples of repeated patterns of web pages. FIG. 1 illustrates a search result with a repeated pattern. The search result 100 includes entries 101-104. Each entry includes a reference (e.g., a hyperlink) to a web page identified as matching the search request. The web page containing the search result may identify a reference by an anchor tag within the portion of an HTML document corresponding to the entry. An anchor tag includes the text displayed as the reference. Each entry also contains additional text describing the referenced web page and additional anchors for cached and similar pages. In this example, the dominant anchor of each element is the anchor that references the web page that matches the search request. The cached and similar pages are anchors, but are not dominant anchors. FIG. 2 illustrates a list of Federal Executive Boards ("FEB") home pages as a repeated pattern. The list 200 contains an entry 201 for each home page of the FEB. Each entry contains a reference to the home page with surrounding text.

In one embodiment, the AET system adapts an MDR-based algorithm to identify repeated patterns within web pages. An MDR-based algorithm is described in Liu, B., Grossman, R., and Zhai, Y., "Mining Data Records in Web Pages," SIGKDD 2003, Aug. 24-27, 2003. The AET system first identifies AET nodes (also referred to more generally as reference explanatory text nodes) within an HTML tag tree of a web page, which generally corresponds to MDR generalized nodes. An AET node, like a generalized node, is a collection of tag tree nodes (or simply nodes) that are adjacent, sibling nodes. (A tag tree is a hierarchical structure that represents the tags of an HTML document as nodes.) An AET node, however, has the additional requirement that at least one node in the collection contain an anchor node with valid surrounding text. After identifying the AET nodes, the AET system identifies AET regions (also referred to more generally as reference explanatory text regions), which generally correspond to MDR data regions. An AET region is a collection of ADT nodes, like an MDR data region is a collection of generalized nodes, that are adjacent, sibling AET nodes (i.e., have the same parent node) and that are similar. The AET system may consider AET nodes to be similar when they have the same length and have an edit distance within a threshold. The length of an AET node is the number of sibling nodes that it contains. The edit distance represents the number of changes needed to transform the hierarchical structure of the nodes within one of the AET nodes into the hierarchical structure of the nodes within the other AET node. The hierarchical structure of a node may be represented by a tag string corresponding to the tags visited in a depth-first traversal of the subtree with its root at the node. In addition, the AET system may use a variable threshold that varies based on characteristics of the tags within the AET nodes.

Figure 3:
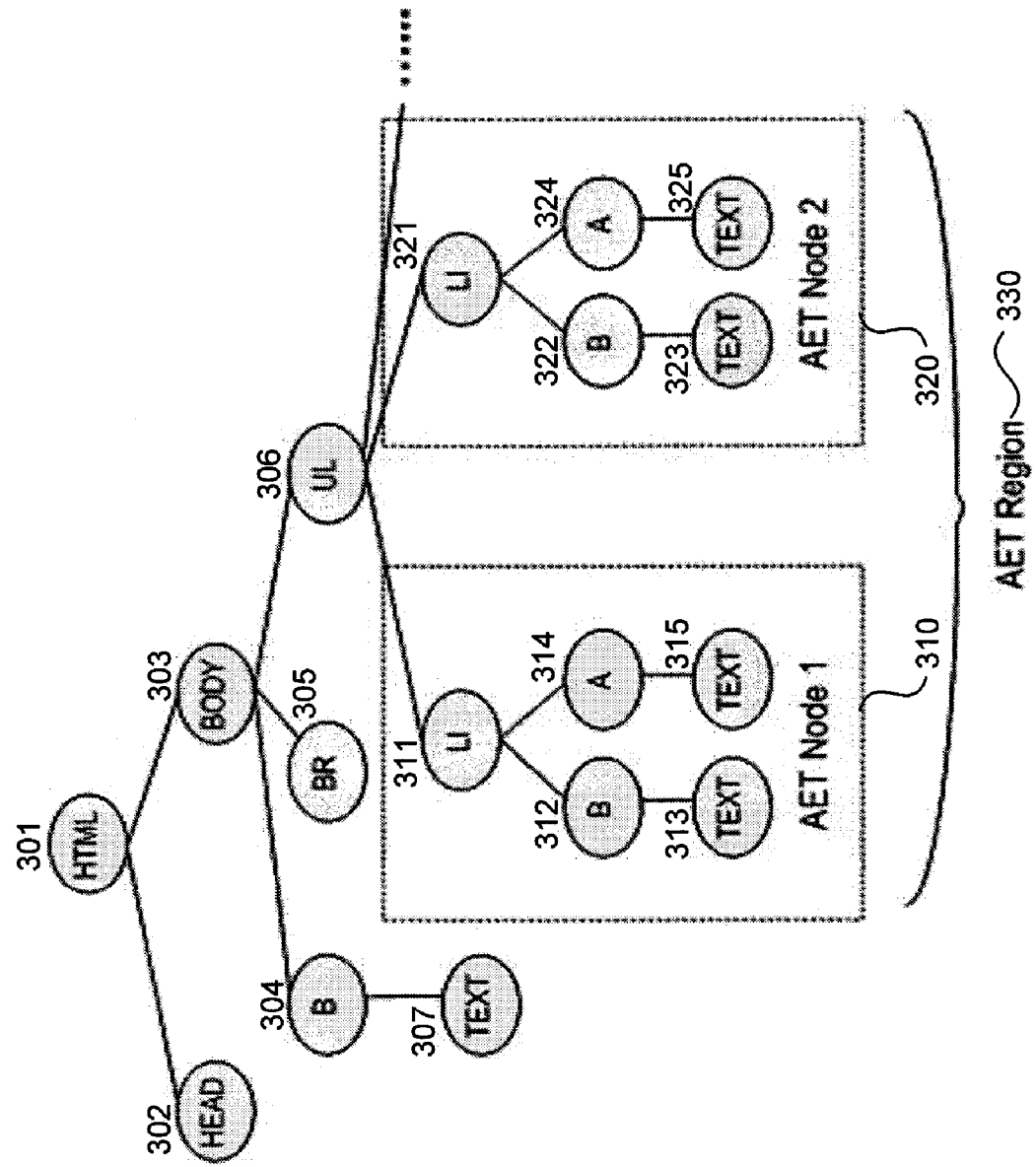
FIG. 3 is a diagram that illustrates a tag tree representation of the web page that contains the list of FEB home pages.

FIG. 3 is a diagram that illustrates a tag tree representation of the web page that contains the list of FEB home pages. The tag tree contains nodes corresponding to the tags of the HTML document representing a web page. The tag tree includes a root HTML tag 301 with a child head tag 302 and a child body tag 303. The body tag includes a child bold tag 304, a child break line tag 305, and a child unordered list tag 306. The bold tag includes a child text tag 307. The unordered list tag includes a child list item tag 311, 321 for each home page in the list. Each list item tag contains a child bold tag 312, 322 and a child anchor tag 314, 324. Each bold tag 312, 322 includes a child text tag 313, 323, and each anchor tag 314, 324 includes a child text tag 315, 325. List item tags 311, 321 correspond to AET nodes 310, 320. In this example, each AET node includes only one child tag of the parent unordered list tag 306. In a more general case, an AET node includes multiple child tags of the parent tag. The AET region 330 includes AET nodes 310, 320.

Figure 4A:
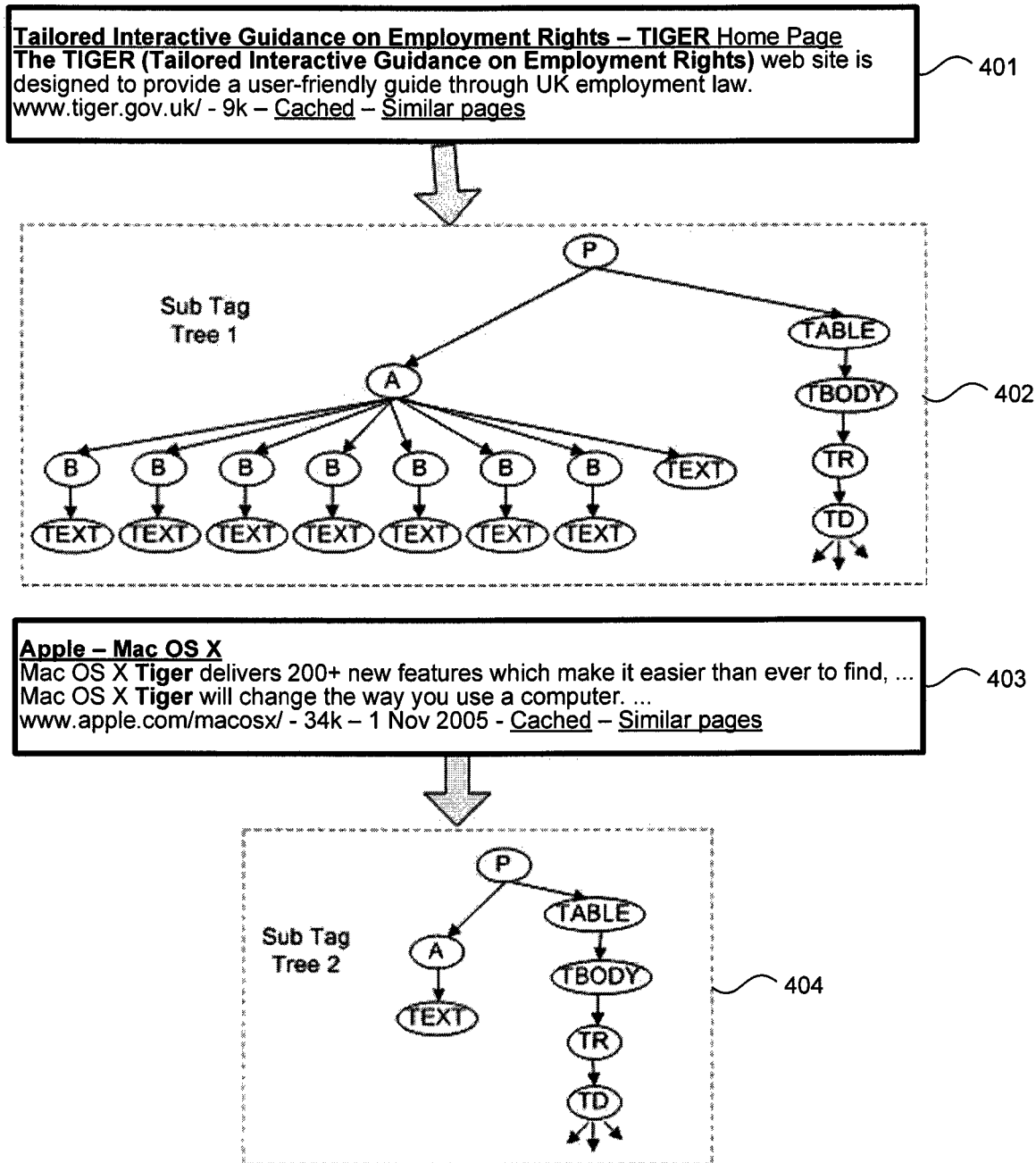
FIG. 4A illustrates subtrees of the tag tree that should be similar AET nodes.
Figure 4B:
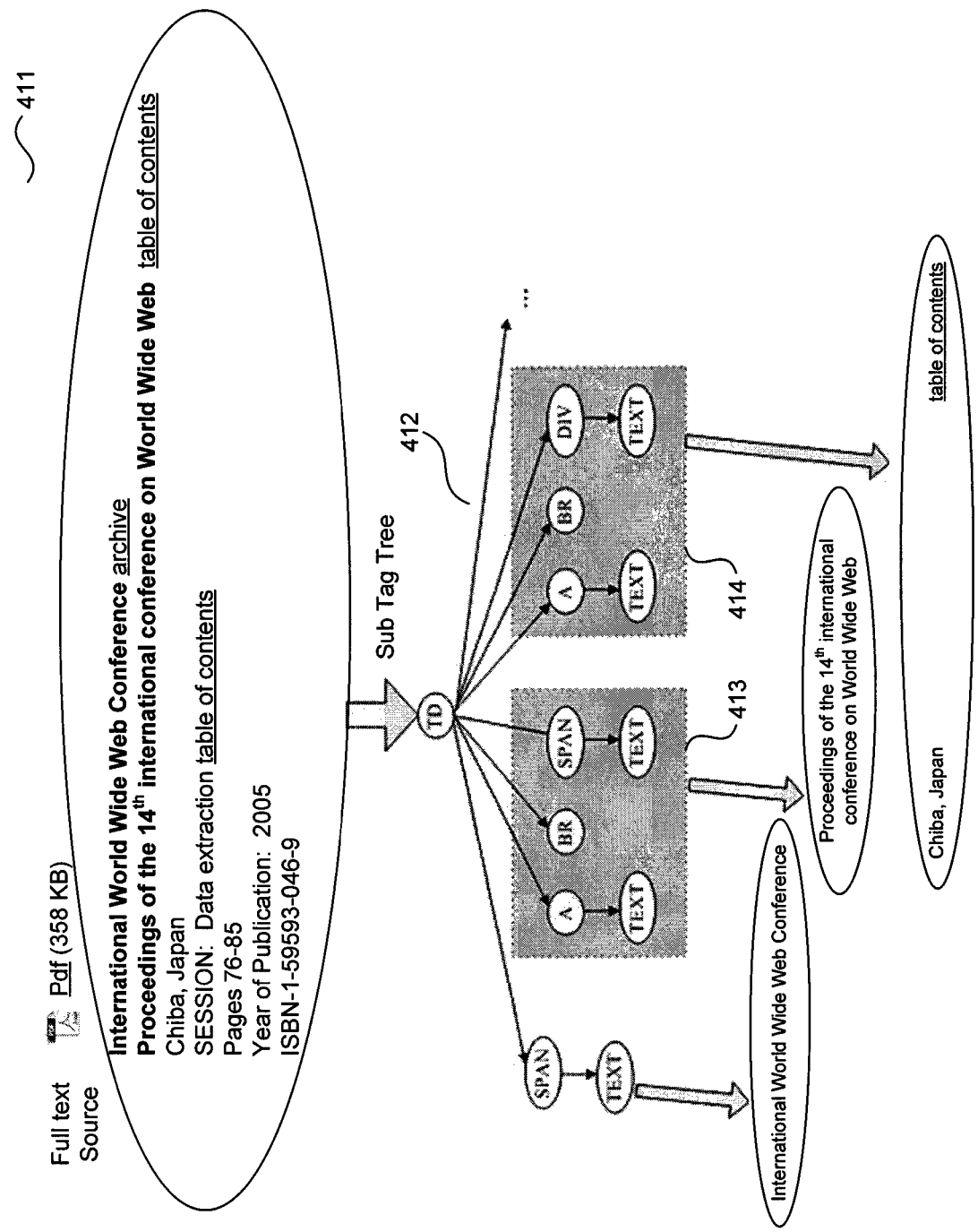
FIG. 4B illustrates subtrees of a tag tree that should not be similar AET nodes.

In one embodiment, the AET system applies a variable or adaptive threshold for edit distance to determine whether two AET nodes are similar. If the AET system uses a small fixed threshold, it may fail to identify some repeated patterns. FIG. 4A illustrates subtrees of the tag tree that should be similar AET nodes. In this example, the search result entry 401 is represented by subtree 402. The anchor tag of subtree 402 contains a separate bold tag and text tag for each word of the anchor text. The search result entry 403 is represented by subtree 404. The anchor tag of subtree 404 contains only one bold tag and one text tag for the entire anchor text. Although the edit distance between the anchor tag of subtree 402 and the anchor tag of subtree 404 is large, the subtrees are similar and thus should be combined into the same AET region as representing the same repeated pattern. If the AET system uses a large fixed threshold, it may, however, incorrectly identify some repeated patterns. FIG. 4B illustrates subtrees of a tag tree that should not be similar AET nodes. In this example, the search result entry 411 contains source information that corresponds to the subtree 412. The identification of AET node 413 and AET node 412 as being similar would be incorrect even though their edit distance is relatively small.

In such a case, a large fixed threshold would lead to incorrectly identifying an AET region comprising AET node 413 and AET node 414.

To help ensure that similar AET nodes are correctly identified, the AET system uses a variable threshold for similarity that is based on the number of block nodes within the AET nodes that are being compared. A block node generally corresponds to a block-type tag of an HTML document. The block-type tags include the CENTER, DD, DIV, DL, DT, FORM, LI, OL, P, PRE, TABLE, TBODY, TD, TR, and UL tags. In one embodiment, the AET system sets the variable threshold depending on whether (1) neither AET node has a block node, (2) only one AET node has a block node(s), (3) both AET nodes have at least two block nodes, and (4) otherwise. The AET system sets the thresholds for a normalized edit distance to −1, 0.1, 0.5, and 0.3 for (1), (2), (3), and (4), respectively. The AET system sets the threshold for (1) to −1 because if an AET node contains no block nodes, then the pattern of a tag string may be ambiguous. A tag string is a depth-first listing of descendant tags of a tag. An example of an ambiguous tag string is <TEXT A TEXT TEXT A TEXT TEXT>, which may contain the pattern of <TEXT A TEXT> or <A TEXT TEXT>. Although setting the threshold to −1 will reduce the recall of the algorithm, it will increase precision of the algorithm.

In one embodiment, the AET system builds an HTML tag tree using a conventional algorithm that is augmented to collect information needed for extracting anchor explanatory text. When building a tag tree, the AET system collects the additional information for each node that indicates whether a descendant node is an anchor tag, whether a descendant node has valid text that surrounds an anchor tag, the number of block nodes within descendant nodes, and the tag string. The AET system considers any combination of alphanumeric characters to be valid text.

In one embodiment, the AET system identifies a dominant anchor for each AET node. If an AET node has multiple anchors, then the dominant anchor would be the anchor of the sole node that contains a block node and that has explanatory text for the anchor. If the AET node has multiple anchors containing a block node with explanatory text surrounding the anchor, then the AET considers none of those anchors to be dominant anchors. The AET system identifies dominant anchors by traversing the tag tree subtree of each node within an AET node in a depth-first manner. When a node has multiple anchors, the AET system decides whether that node has a dominant anchor, which is propagated up the subtree for determining the dominant anchor of its parent node. The AET system specifies two criteria for identifying dominant anchors. The AET system repeatedly applies the criteria to pairs of nodes with dominant anchors to determine whether only one node is left as a candidate to contain the dominant anchor for the node. If so, then that node contains the dominant anchor, else there is no dominant anchor. Each criterion determines whether either of the nodes can be eliminated as a candidate based on the attributes of the other node. The AET system starts determining the dominant anchor by creating a list of the sibling nodes within an AET node and recursively applying the criteria. The first criterion, which is applied when both nodes of a pair have dominant anchors, is as follows:

If both nodes are not block nodes, eliminate both since neither is dominant over the other.

If one node is a block node and the other is not, eliminate the non-block node since the non-block node is dominated by the other.

If both nodes are block nodes and their tag strings are the same, eliminate both since neither is dominated by the other.

If both nodes are block nodes, eliminate any node that does not contain explanatory text since any node without explanatory text is dominated by a node with explanatory text and if neither has explanatory text, then neither is dominated by the other.

The second criterion, which is applied when only one of the pair of nodes has a dominant anchor, is as follows:

If both nodes are block nodes with the same tag string and the node without the dominant anchor has explanatory text, eliminate the node with the dominant anchor.

FIG. 5 illustrates the condition that the second criterion is designed to identify. The entry 501 of a web page corresponds to an AET node with tag tree 502. The subtree 503 contains a dominant anchor, and the subtree 504 contains no dominant anchor. These nodes may be grouped into the same AET node because of their similarity. However, since the subtree 504 contains explanatory text, all the text that surrounds the anchor in the entry is not directly related to the entry. As a result, the AET system eliminates the dominant anchor of subtree 503 as being a candidate for the dominant anchor of the AET node.

Figure 6:
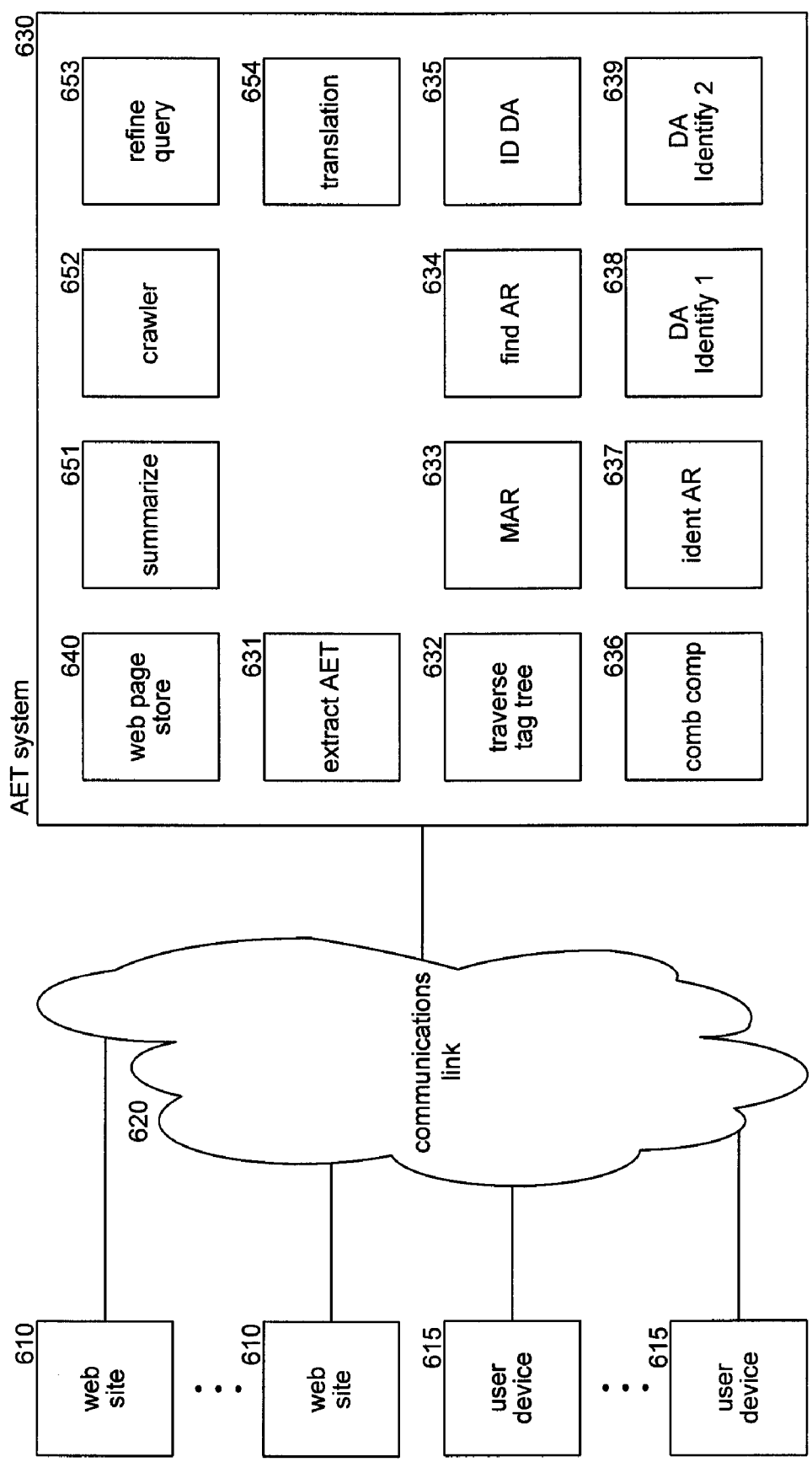
FIG. 6 is a block diagram that illustrates components of the AET system in one embodiment.

FIG. 6 is a block diagram that illustrates components of the AET system in one embodiment. The AET system 630 is connected via communications link 620 to web sites 610 and user devices 615. The AET system includes an extract AET component 631, a traverse tag tree component 632, a mine anchor records ("MAR") component 633, a find anchor regions ("ARs") component 634, an ID dominant anchor ("DA") component 635, a combination compare ("combcomp") component 636, an identify ARs component 637, a DA identify1 component 638, and a DA identify2 component 639. The extract AET component generates a tag tree and invokes the traverse tag tree component to collect the information needed for anchor explanatory text extraction. The extract AET component also invokes the MAR component to determine the similarity between various combinations of adjacent, sibling nodes (i.e., potential AET nodes), invokes the find ARs component to find AET regions, and invokes the ID DA component to identify dominant anchors for the AET nodes within the AET regions. These components in turn invoke helper components that include the combcomp component, the identify ARs component, the DA identify1 component, and the DA identify2 component. The system may extract explanatory text from the web pages identified in a web page store 640. The AET system may be used in conjunction with various applications such as a summarize application 651, a crawler application 652, a refine query application 653, and a translation application 654. The summarize application may generate a summary of a web page based on explanatory text associated with dominant anchors that reference the web page. The crawler application may use the explanatory text in prioritizing unvisited URLs. The refine query application may use the explanatory text to automatically refine a query. The translation application may use the anchor explanatory text to incrementally discover knowledge for extracting multilingual translations of query terms.

The computing devices on which the AET system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the AET system. In addition, the data structures and message structures may be stored or transmitted via a data transmission medium, such as a signal on a communications link. Various communications links may be used, such as the Internet, a local area network, a wide area network, or a point-to-point dial-up connection.

The AET system may be implemented on various computing systems or devices including personal computers, server computers, hand-held or laptop devices, multiprocessor systems, microprocessor-based systems, network PCs, mini-computers, mainframe computers, distributed computing environments that include any of the above systems or devices, and the like. The AET system may also provide its services to various computing systems such as personal computers, cell phones, personal digital assistants, consumer electronics, home automation devices, and so on.

The AET system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 7:
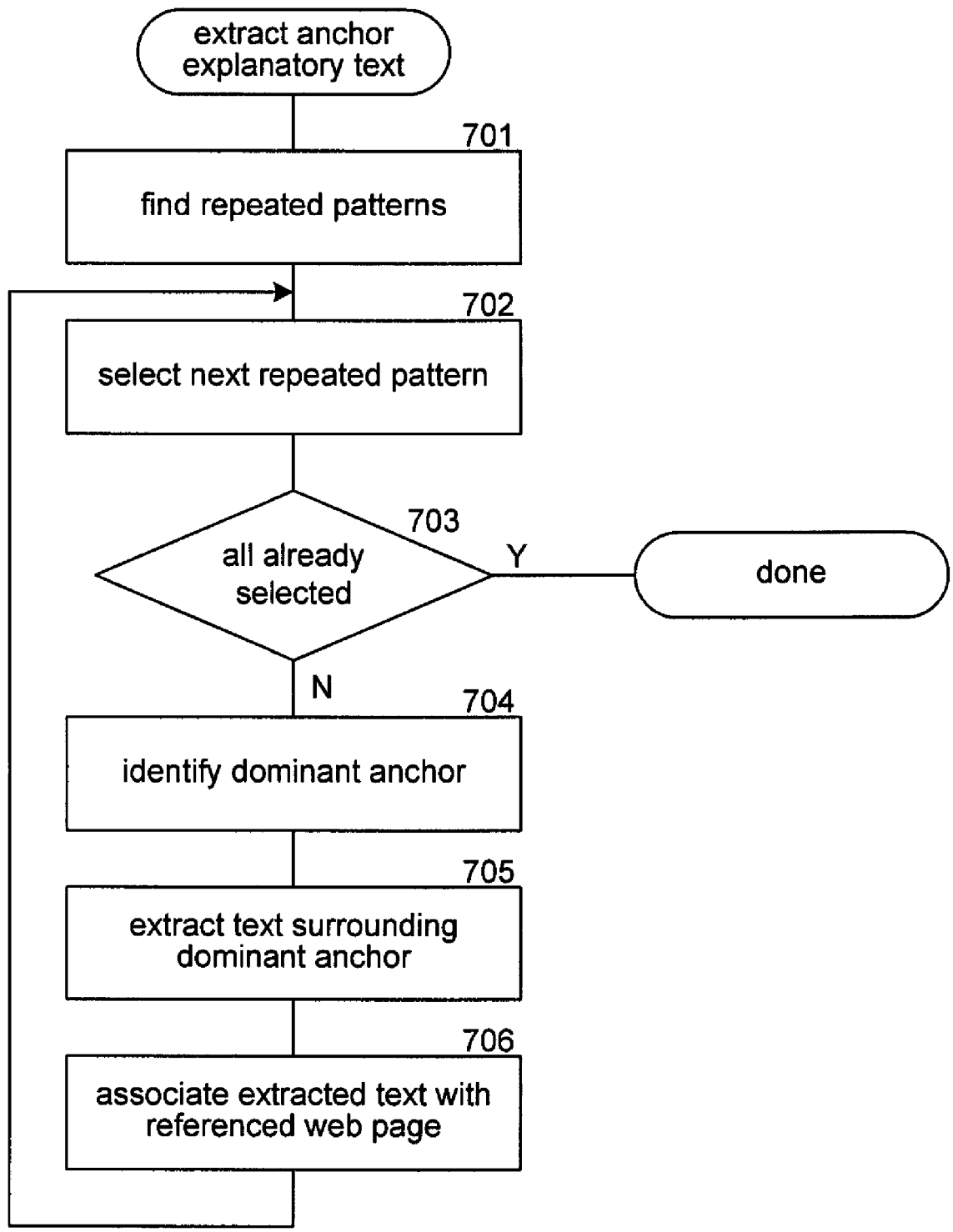
FIG. 7 is a flow diagram that illustrates the processing of a high-level description of an extract anchor explanatory text component of the AET system in one embodiment.

FIG. 7 is a flow diagram that illustrates the processing of a high-level description of an extract anchor explanatory text component of the AET system in one embodiment. In block 701, the component finds the repeated patterns within a web page. In blocks 702-706, the component loops extracting explanatory text associated with dominant anchors. In block 702, the component selects the next repeated pattern. In decision block 703, if all the repeated patterns have already been selected, then the component completes, else the component continues at block 704. In block 704, the component identifies the dominant anchor, if any, of the selected repeated pattern. In block 705, the component extracts text surrounding the dominant anchor. In block 706, the component associates the extracted explanatory text with the referenced web page. The component then loops to block 702 to select the next repeated pattern.

Figure 8:
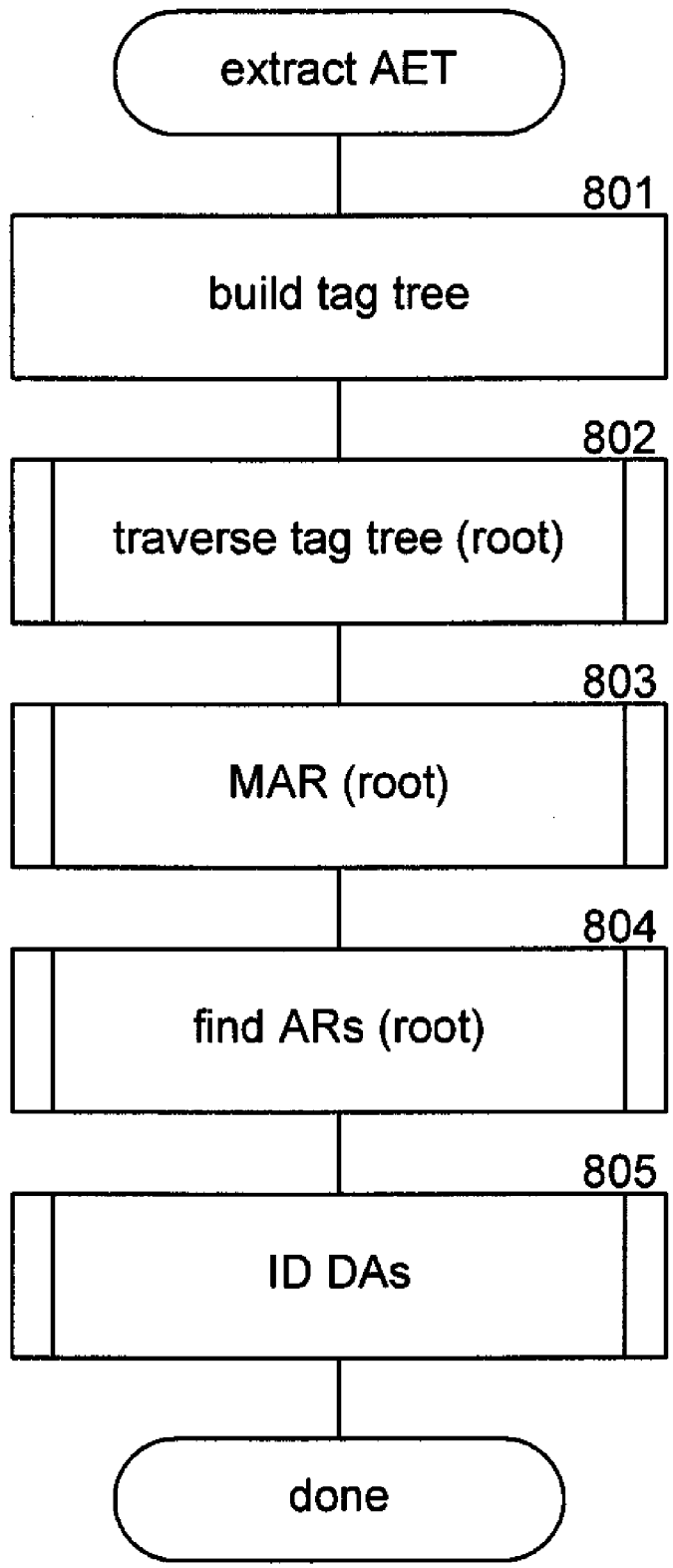
FIG. 8 is a flow diagram that illustrates the processing of a more detailed extract AET component of the AET system in one embodiment.

FIG. 8 is a flow diagram that illustrates the processing of a more detailed extract AET component of the AET system in one embodiment. In block 801, the component builds the tag tree for a web page. In block 802, the component invokes the traverse tag tree component passing the root of the tag tree to collect the data needed for extracting anchor explanatory text. In block 803, the component invokes the MAR component to calculate the similarity between sequences of nodes that may form an AET node. In block 804, the component invokes the find ARs component to identify the AET regions. In block 805, the component invokes the ID DA component for each AET node of an AET region to identify the dominant anchors and extract the surrounding explanatory text. The component then completes.

Figure 9:
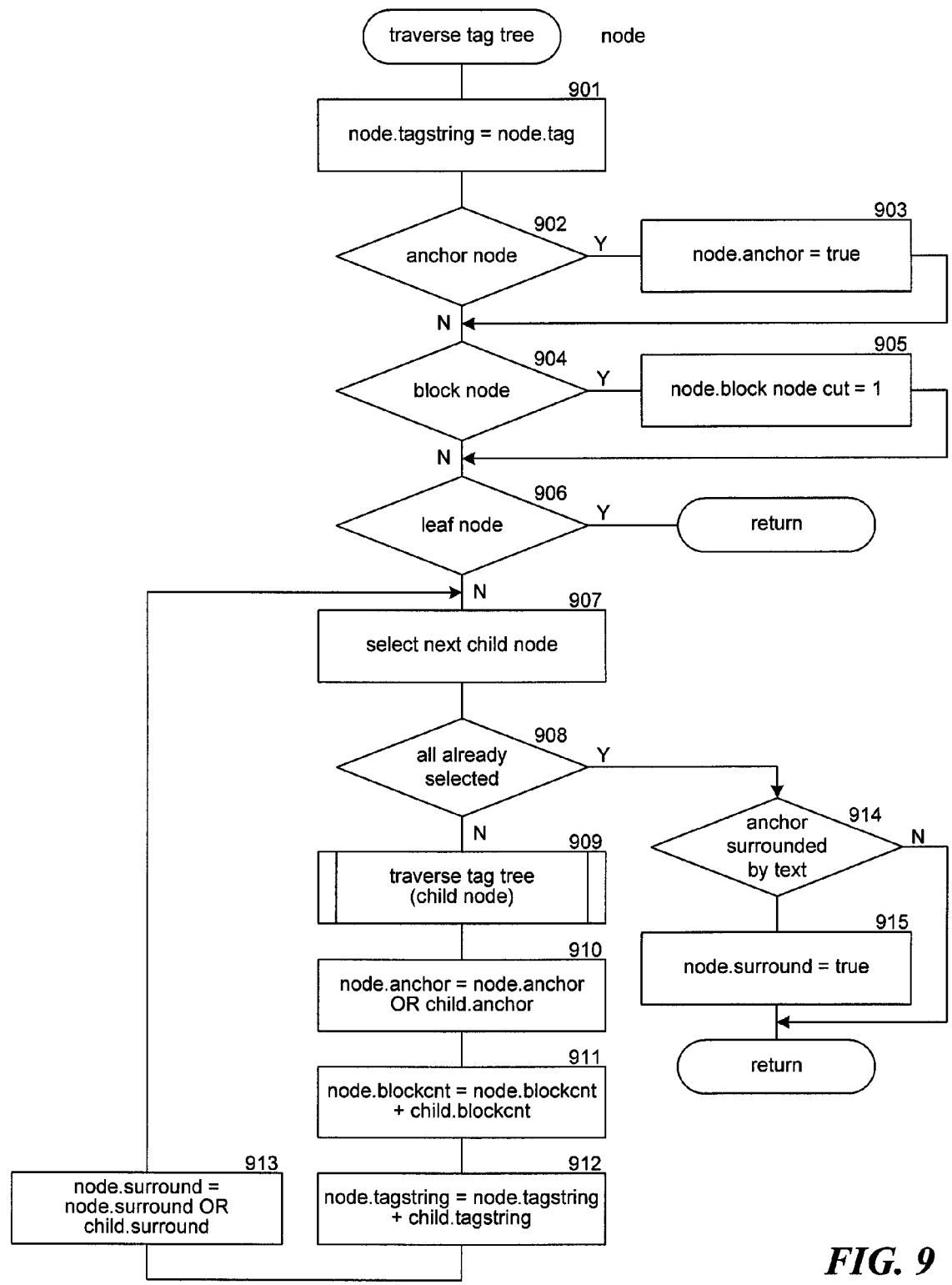
FIG. 9 is a flow diagram that illustrates the processing of the traverse tag tree component in one embodiment.

FIG. 9 is a flow diagram that illustrates the processing of the traverse tag tree component in one embodiment. The component recursively invokes itself to traverse the tag tree with its root at the passed node in a depth-first manner. In blocks 901-905, the component initializes the information to be collected for the node. In block 901, the component initializes the tag string for the node. In decision block 902, if the node is an anchor node, then the component initializes an anchor flag for the node in block 903, else the component continues at block 904. In decision block 904, if the node is a block node, then the component initializes the block count of the node in block 905, else the component continues at block 906. In decision block 906, if the node is a leaf node, then the component returns, else the component continues at block 907. In blocks 907-913, the component loops recursively invoking itself for each child node of the passed node. In block 907, the component selects the next child node. In decision block 908, if all the child nodes have already been selected, then the component continues at block 914, else the component continues at block 909. In block 909, the component recursively invokes the traverse tag tree component passing the child node. In block 910, the component accumulates the anchor flag of the child node into the passed node. In block 911, the component accumulates the block count of the child node into the passed node. In block 912, the component accumulates the tag string of the child node into the passed node. In block 913, the component accumulates the surrounding text information for the child node into the surrounding text information for the passed node. The component then loops to block 907 to select the next child node. In decision block 914, if the passed node has an anchor surrounded by text, then the component sets the surrounding text indicator for the passed node in block 915. The component then completes.

Figure 10:
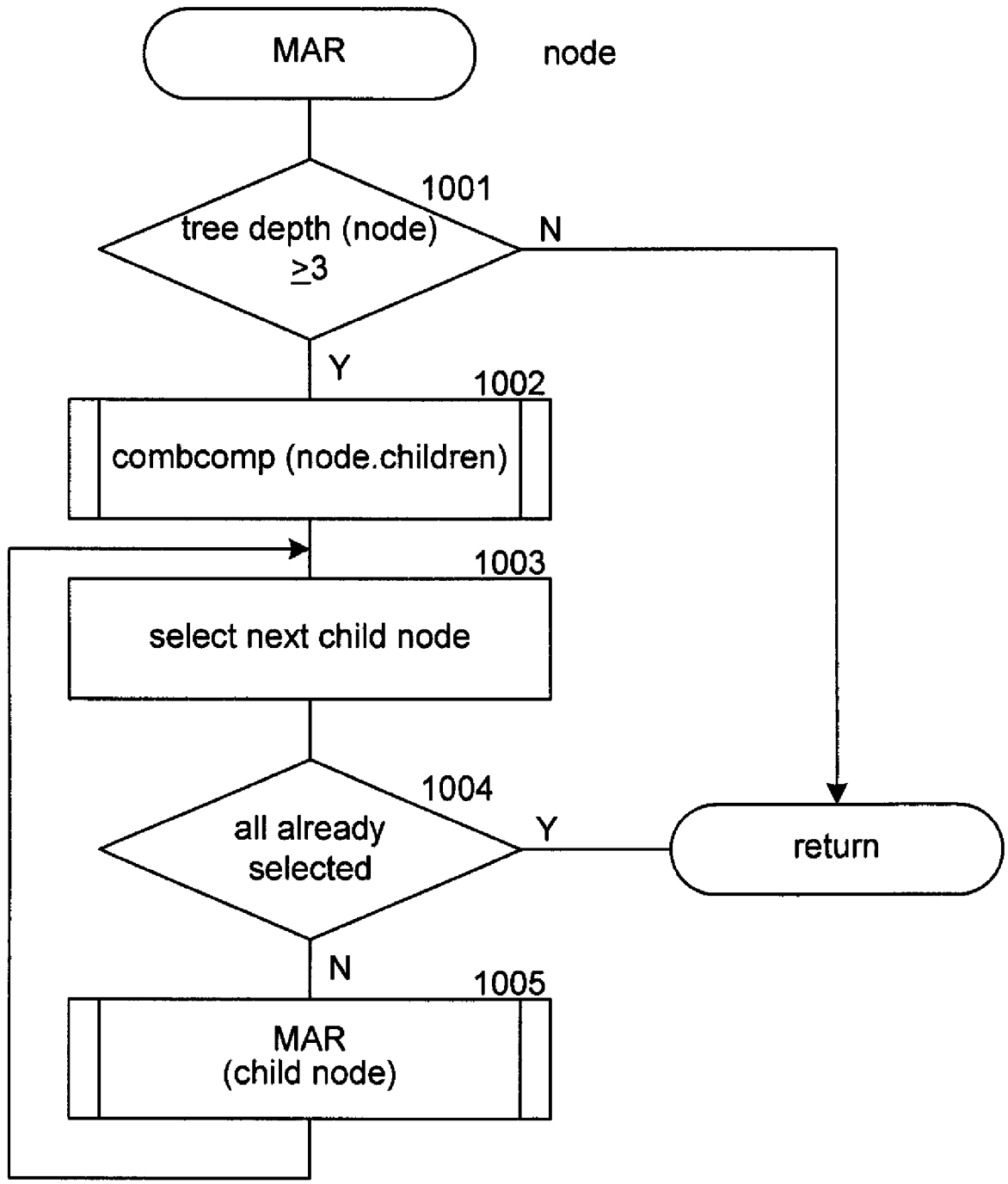
FIG. 10 is a flow diagram illustrating the processing of the MAR component of the AET system in one embodiment.

FIG. 10 is a flow diagram illustrating the processing of the MAR component of the AET system in one embodiment. The component determines the similarity between sequences of nodes. In decision block 1001, if the depth of the tree from the passed node is greater than or equal to three, then the component continues at block 1002, else the component returns. In block 1002, the component invokes the combcomp component to calculate the similarity between various combinations of child nodes for possible identification as AET nodes. In blocks 1003-1005, the component loops recursively invoking the MAR component for each child node. In block 1003, the component selects the next child node of the passed node. In decision block 1004, if all the child nodes have already been selected, then the component returns, else the component continues at block 1005. In block 1005, the component recursively invokes the MAR component passing the child node and then loops to block 1003 to select the next child node.

Figure 11:
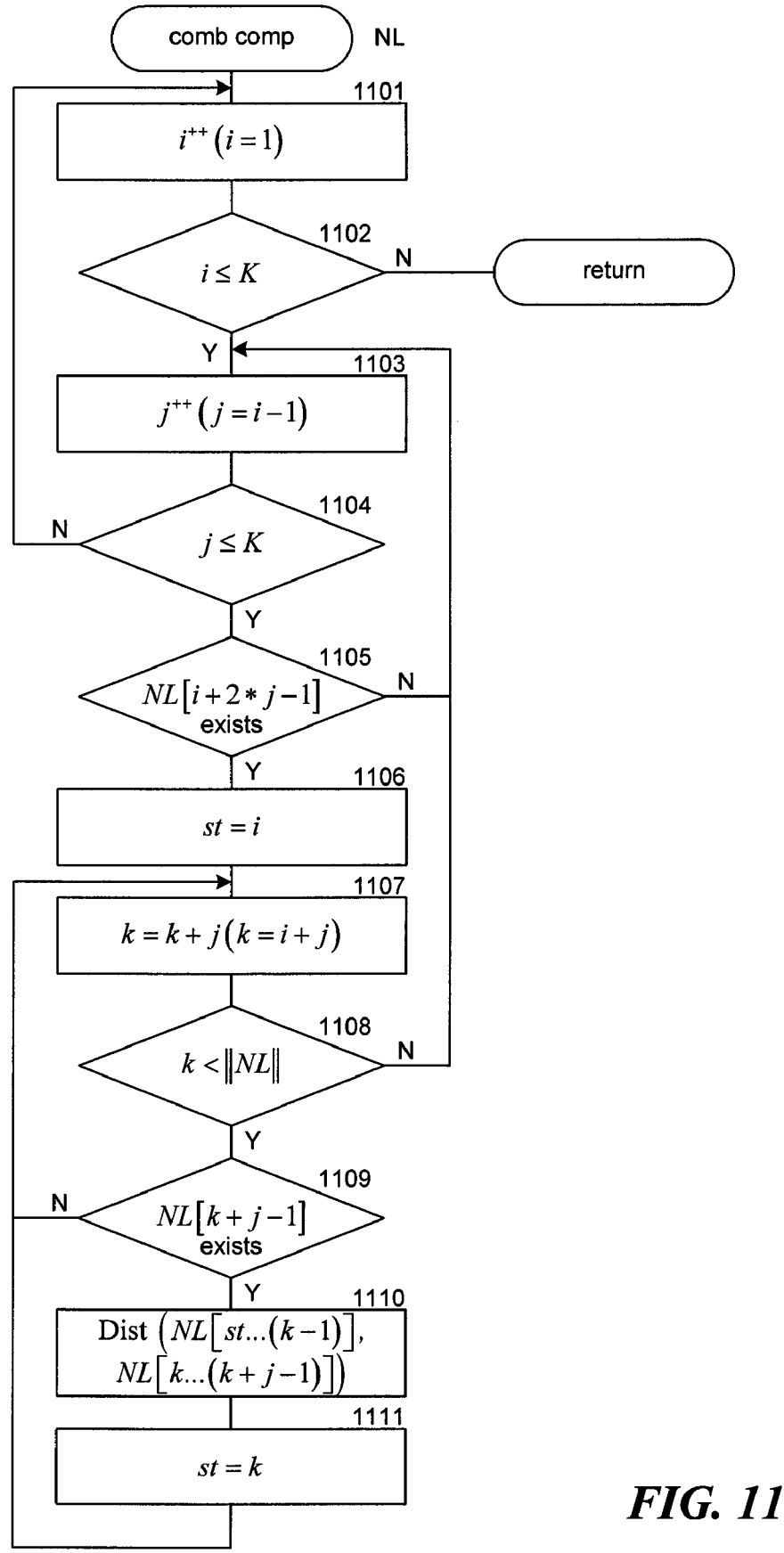
FIG. 11 is a flow diagram that illustrates the processing of the combcomp component of the AET system in one embodiment.

FIG. 11 is a flow diagram that illustrates the processing of the combcomp component of the AET system in one embodiment. The component loops selecting collections of adjacent nodes of the passed list of nodes and calculating their similarity as potential AET nodes. In block 1101, the component increments a variable i for indicating the node in the node list that is the start of the next first possible AET node to have its similarity calculated, starting at the first node. In decision block 1102, if the variable is less than or equal to the maximum number of nodes in a combination, then the component continues at block 1103, else the component returns. In blocks 1103-1111, the component loops calculating the similarity of possible AET nodes of different lengths, starting with a length equal to the current start. During the first iteration with variable i equal to 1, the component calculates the similarity for AET nodes starting at the first node for AET nodes of length 1 to the maximum length of an AET node. During the second iteration with variable i equal to 2, the component only needs to calculate the similarity for AET nodes of length 2 to the maximum length, since the first iteration calculated the similarity for all possible AET nodes of length 1 and similarly for subsequent iterations. In block 1103, the component sets the length j of the AET nodes for the next iteration starting at the variable i. In decision block 1104, if the length is less than or equal to the maximum length, then the component continues at block 1105, else the component loops to block 1101 to select the next start node. In decision block 1105, if there are at least two full possible AET nodes to compare at the current length, then the component continues at block 1106, else the component loops to block 1103 to select the next length, which will also be too long. In blocks 1106-1111, the component loops calculating the similarity between successive pairs of possible AET nodes. In block 1106, the component initializes the start node of the first AET node of the pair. In block 1107, the component increments the variable k to point to the start of the second AET node of the pair. In decision block 1108, if the variable k is less than the number of nodes in the node list, then the component continues at block 1109, else the component loops to block 1103 to select the next length. In decision block 1109, if there are enough nodes in the node list to fill out the second AET node, then the component continues at block 1110, else the component loops to block 1107 to select the next second AET node of a pair, which will be passed the end of the list. In block 1110, the component calculates the edit distance between the first and the second AET nodes of the pair. In block 1111, the component sets the start of the first AET node for the second iteration to the start of the current second AET node and then loops to block 1107.

Figure 12:
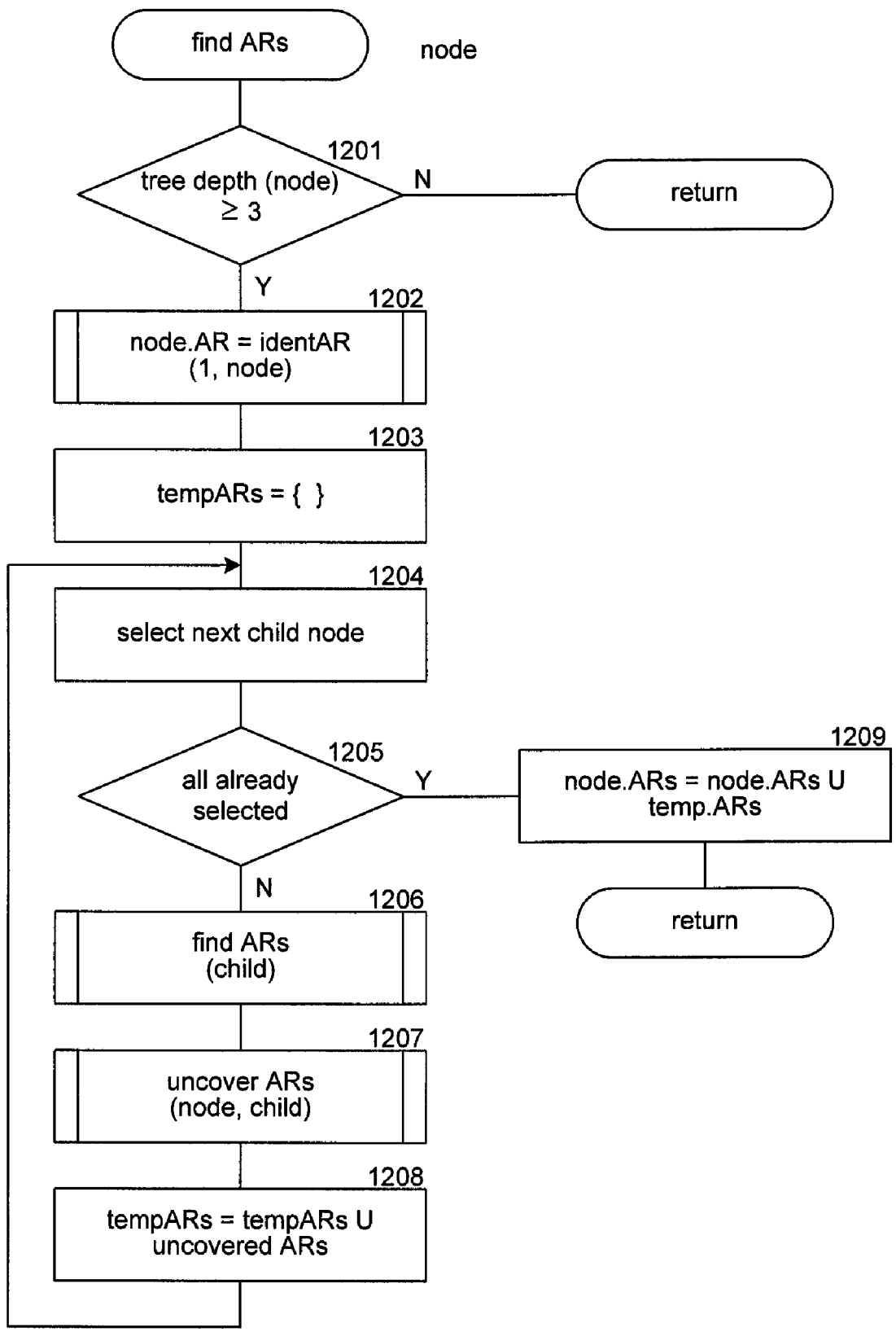
FIG. 12 is a flow diagram that illustrates the processing of the find ARs component of the AET system in one embodiment.

FIG. 12 is a flow diagram that illustrates the processing of the find ARs component of the AET system in one embodiment. The component traverses the tag tree in a depth-first manner identifying possible AET regions on the way down and determining whether a parent AET region covers a child AET region on the way up. The component discards the covered AET regions. In decision block 1201, if the tree depth from the passed node is greater than or equal to three, then the component continues at block 1202, else the component returns. In block 1202, the component invokes the identify ARs component to identify potential AET regions within the child nodes of the passed node. In block 1203, the component initializes a list of possible AET regions. In blocks 1204-1208, the component loops recursively invoking the find ARs component for each child node. In block 1204, the component selects the next child node. In decision block 1205, if all the child nodes have already been selected, then the component continues at block 1209, else the component continues at block 1206. In block 1206, the component recursively invokes the find ARs component passing the selected child node. In block 1207, the component invokes the uncover ARs component to identify any uncovered AET regions of the selected child node. In block 1208, the component accumulates the uncovered AET regions and then loops to block 1204 to select the next child node. In block 1209, the component accumulates the uncovered AET regions of the child nodes into the AET regions of the passed node and then returns.

Figure 13:
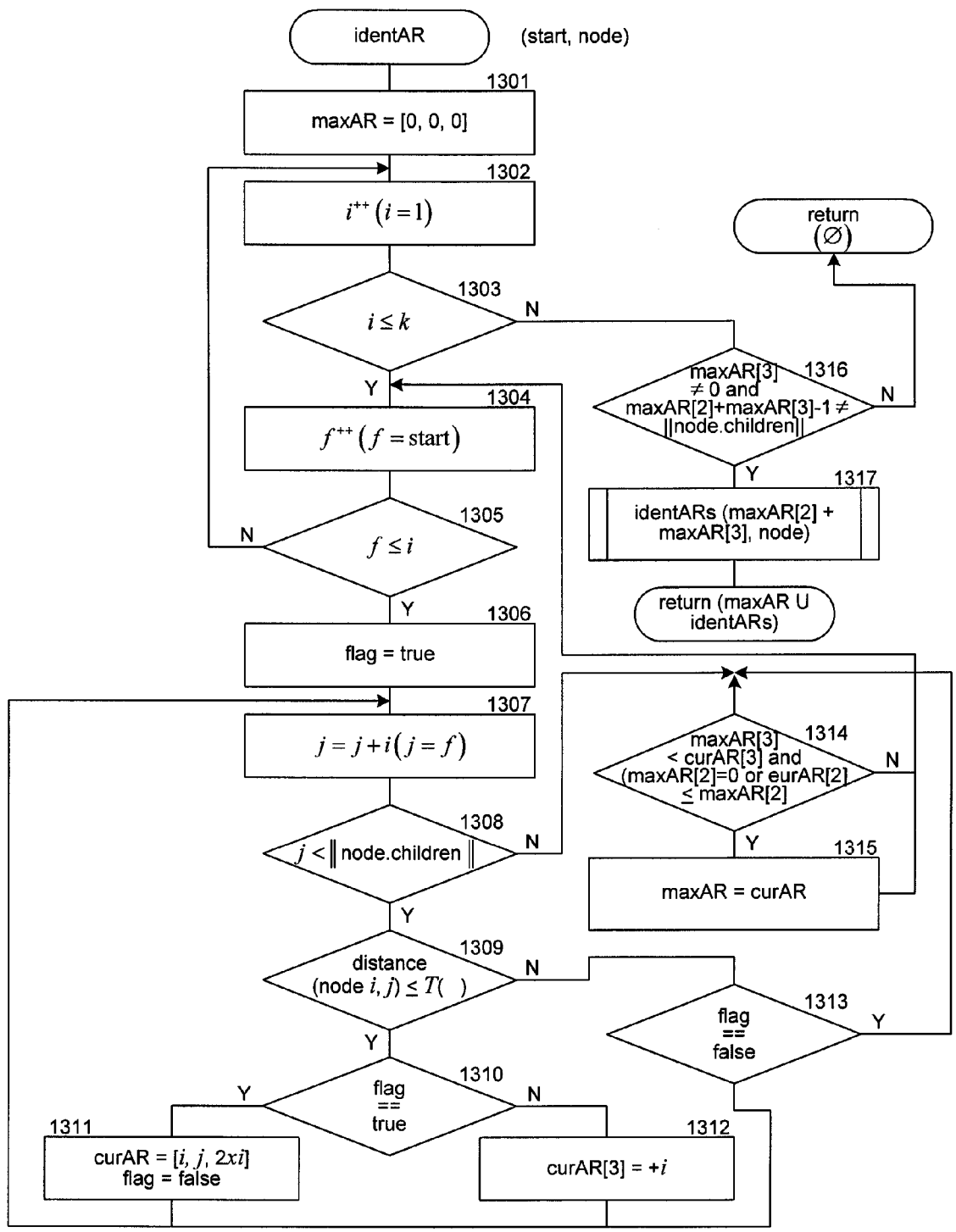
FIG. 13 is a flow diagram that illustrates the processing of the identify ARs component of the AET system in one embodiment.

FIG. 13 is a flow diagram that illustrates the processing of the identify ARs component of the AET system in one embodiment. The component is recursively invoked to identify AET regions that cover the maximum number of AET nodes. The variable maxAR indicates the number of nodes in a combination, the location of the start child in a node of the AET region, and the number of nodes involved in or covered by the AET region. The variable curDR represents the current data region being considered. The component is passed a start location and a node. In block 1301, the component initializes the variable maxAR. In block 1302, the component increments the variable i to indicate the next length of an AET node, starting at 1. In decision block 1303, if the length is less than or equal to the maximum length, then the component continues at block 1304, else the component continues at block 1316. In block 1304, the component increments the variable f, starting with the passed start value. In decision block 1305, if the variable f is less than or equal to the variable i, then the component continues at block 1306, else the component loops to block 1302 to select the next length. In block 1306, the component sets a flag to true. In block 1307, the component increments the variable j by the variable i, starting with the variable f. In decision block 1308, if the variable j is less than the number of child nodes, then the component continues at block 1309, else the component continues at block 1314. In decision block 1309, if the distance of the edit distance for the length i of the jth child node is less than the variable threshold, then the component continues at block 1310, else the component continues at block 1313. In block 1310, if the flag is true, then the component continues at block 1311, else the component continues at block 1312. In block 1311, the component starts an AET region and sets the flag to false and then loops to block 1307 to select the next AET node. In block 1312, the component continues the current AET region and loops to block 1307 to select the next AET node. In block 1313, if no AET region has been started, then the component loops to block 1307 to select the next AET node, else the component continues at block 1314. In block 1314, the component determines whether the current AET region should replace the maxAR including whether the AET node contains an anchor tag with surrounding text. If so, the component continues at block 1315 to replace the variable maxAR. The component loops to block 1304 to select the next variable f. In decision block 1316, the component determines whether to return an indication of no AET regions. If the component does not return, the component recursively invokes the identify ARs component in block 1317 and then returns the accumulation of the maxAR and the ARs identified by the recursive invocation.

Figure 14:
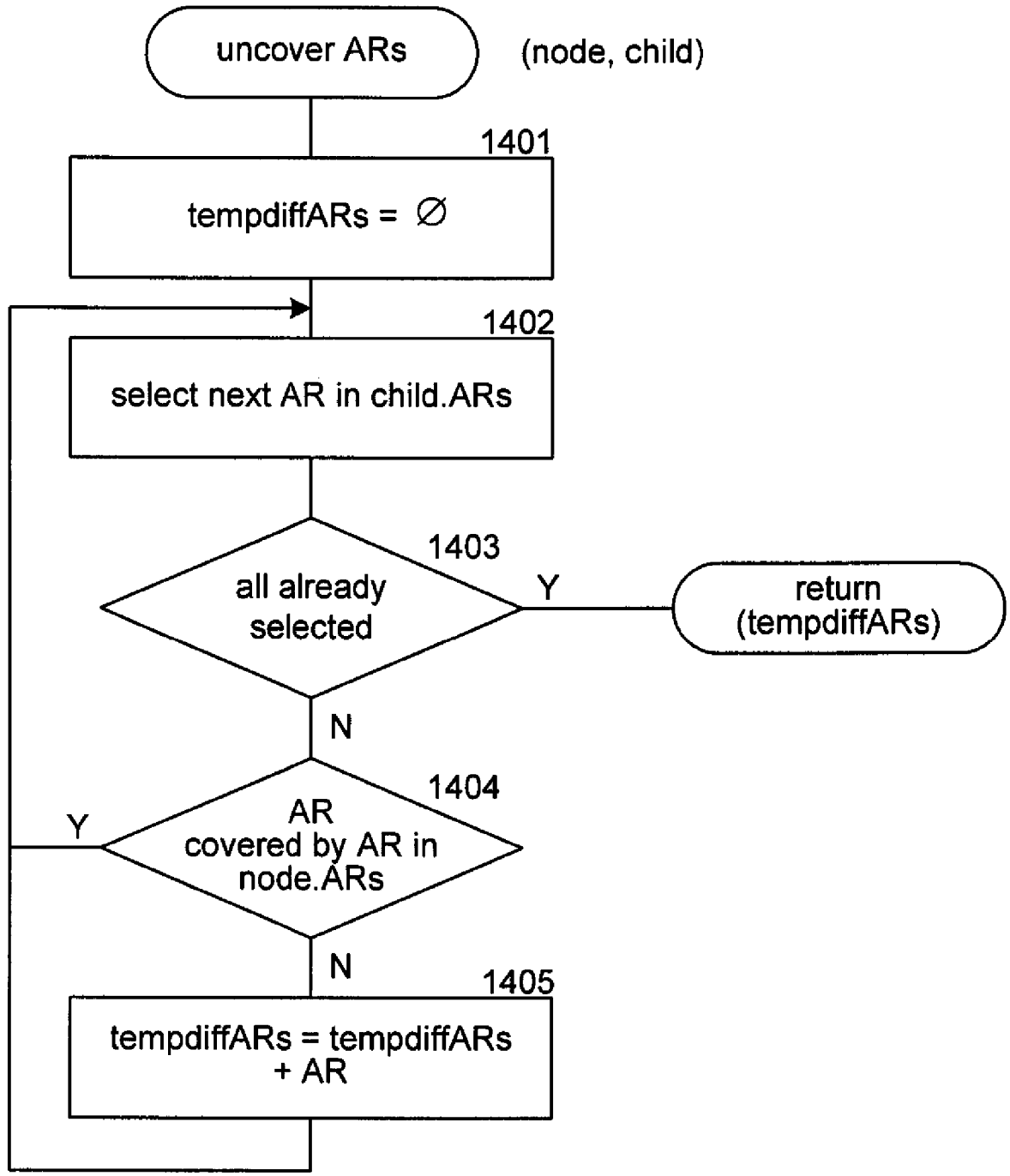
FIG. 14 is a flow diagram that illustrates the processing of the uncover ARs component of the AET system in one embodiment.

FIG. 14 is a flow diagram that illustrates the processing of the uncover ARs component of the AET system in one embodiment. The component is passed a node and one of its child nodes. In block 1401, the component initializes a variable to track the uncovered AET regions. In block 1402, the component selects the next AET region of the child node. In decision block 1403, if all the AET regions have already been selected, then the component returns the uncovered AET regions, else the component continues at block 1404. In decision block 1404, if the selected AET region is covered by an AET region of the parent node, then the component loops to block 1402 to select the next AET region of the child node, else the component continues at block 1405. In block 1405, the component adds the selected AET region to the list of uncovered AET regions and then loops to block 1402.

Figure 15:
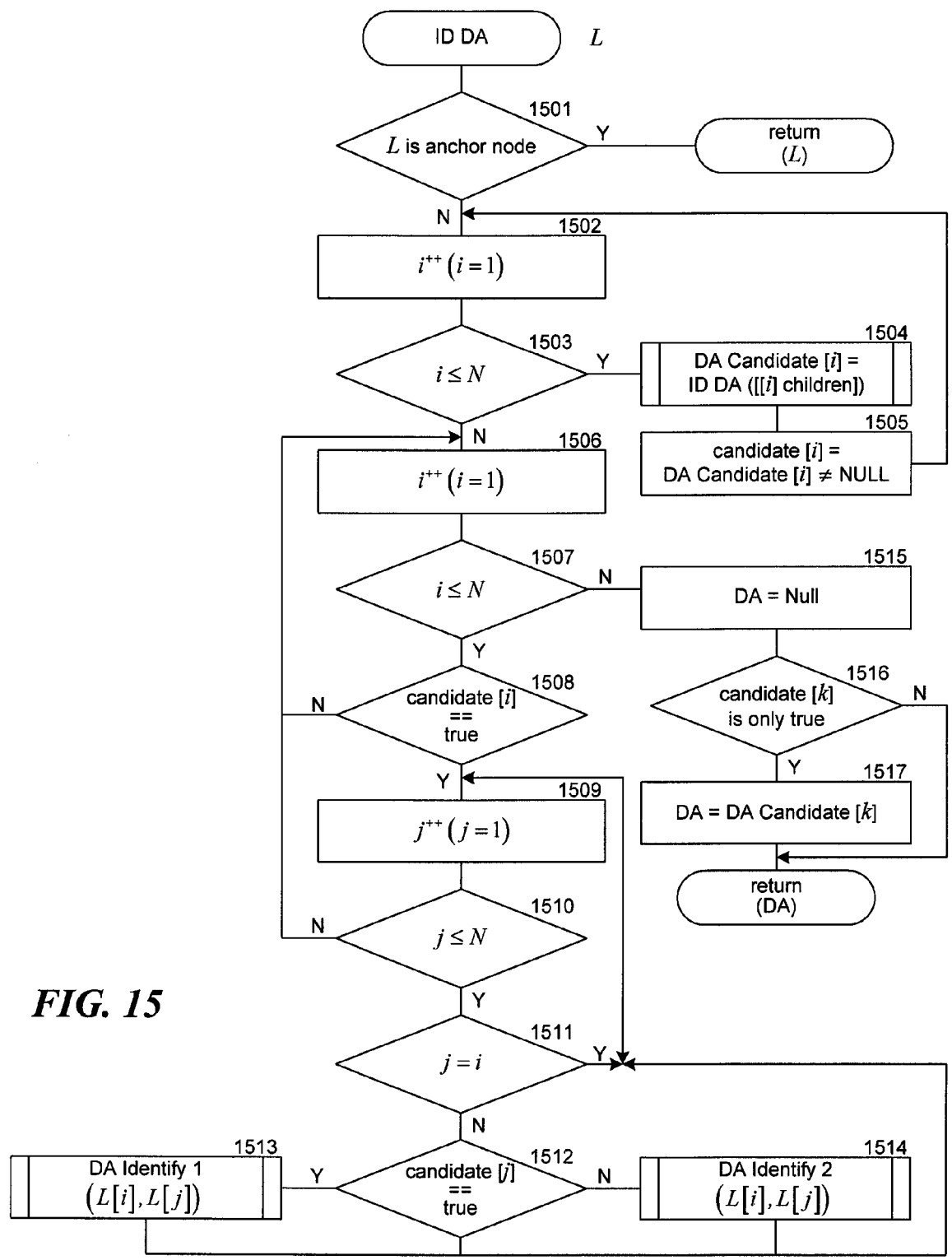
FIG. 15 is a flow diagram that illustrates the processing of the ID DA component of the AET system in one embodiment.

FIG. 15 is a flow diagram that illustrates the processing of the ID DA component of the AET system in one embodiment. The component is passed a list of nodes and determines whether an anchor within one of those nodes is a dominant anchor. In decision block 1501, if the list contains only an anchor node, then the component returns, else the component continues at block 1502. In blocks 1502-1505, the component loops recursively invoking the ID DA component. In block 1502, the component selects the next node of the node list starting with the first. In decision block 1503, if all the nodes in the node list have not yet been selected, then the component continues at block 1504, else the component continues at block 1506. In block 1504, the component recursively invokes the ID DA component to identify a dominant anchor for the selected node. In block 1505, the component indicates whether the selected node has a dominant anchor and then loops to block 1502 to select the next node. In blocks 1506-1514, the component loops identifying a dominant anchor for the passed list of nodes. In block 1506, the component selects the next node in the list. In decision block 1507, if not all the nodes have been selected, then the component continues at block 1508, else the component continues at block 1515. In decision block 1508, if the selected node has a candidate anchor, then the component continues at block 1509, else the component loops to block 1506 to select the next node. In blocks 1509-1514, the component loops choosing every node to determine whether one can be eliminated as a candidate dominant anchor based on comparison to the selected node. In block 1509, the component chooses the next node of the node list. In decision block 1510, if not all the nodes have been chosen, then the component continues at block 1511, else the component loops to block 1506. In decision block 1511, if the selected node and the chosen node are the same, then the component loops to block 1509 to choose the next node, else the component continues at block 1512. In decision block 1512, if the chosen node is a candidate anchor, then the component continues at block 1513, else the component continues at block 1514. In block 1513, the component invokes the component to apply the first criterion for a dominant anchor and then loops to block 1509 to choose the next node. In block 1514, the component invokes the component to apply the second criterion for a dominant anchor and then loops to block 1509 to choose the next node. In block 1515, the component initializes a dominant anchor to null. In decision block 1516, if there is only one candidate anchor, then the component continues at block 1517, else the component returns an indication that there is no dominant anchor. In block 1517, the component sets and returns the dominant anchor.

Figure 16:
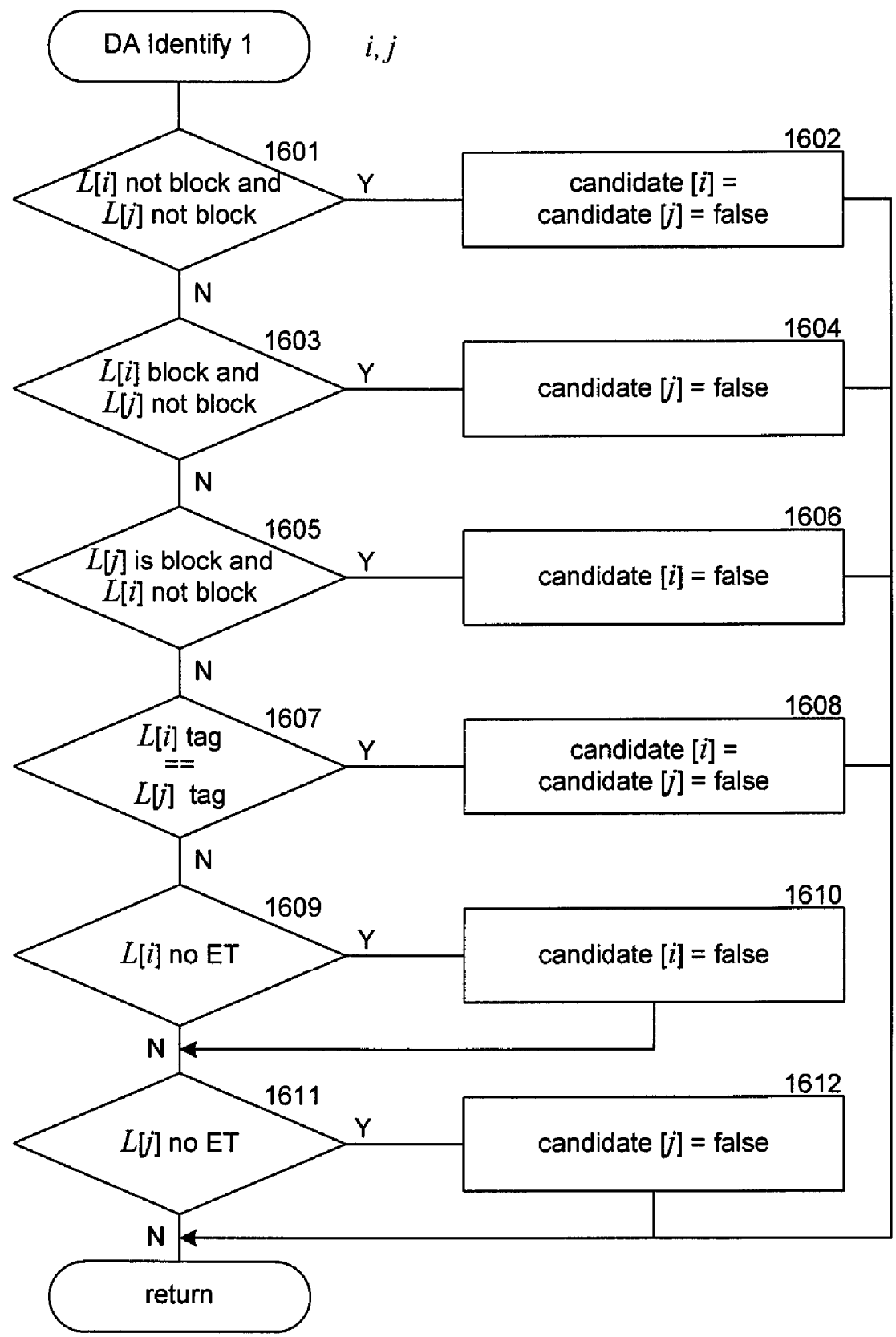
FIG. 16 is a flow diagram that illustrates the processing of the DA identify1 component of the AET system in one embodiment.

FIG. 16 is a flow diagram that illustrates the processing of the DA identify1 component of the AET system in one embodiment. The component applies criterion 1 to determine whether one or both of a pair of nodes can be eliminated as a candidate for a dominant anchor. In decision block 1601, if neither node is a block node, then the component eliminates both nodes as candidate nodes in block 1602 and then returns, else the component continues at block 1603. In decision blocks 1603 and 1605, if one of the nodes is a block and the other is not, then the component eliminates the other block as a candidate in blocks 1604 and 1606 and then returns, else the component continues at block 1607. In decision block 1607, if both the nodes are blocks and their tag strings are equal, then the component eliminates both the nodes as candidates in block 1608 and then returns, else the component continues at block 1609. In decision blocks 1609 and 1611, if either or both nodes are block nodes with no explanatory text, then the component eliminates either or both nodes in blocks 1610 and 1612, and then returns.

Figure 17:
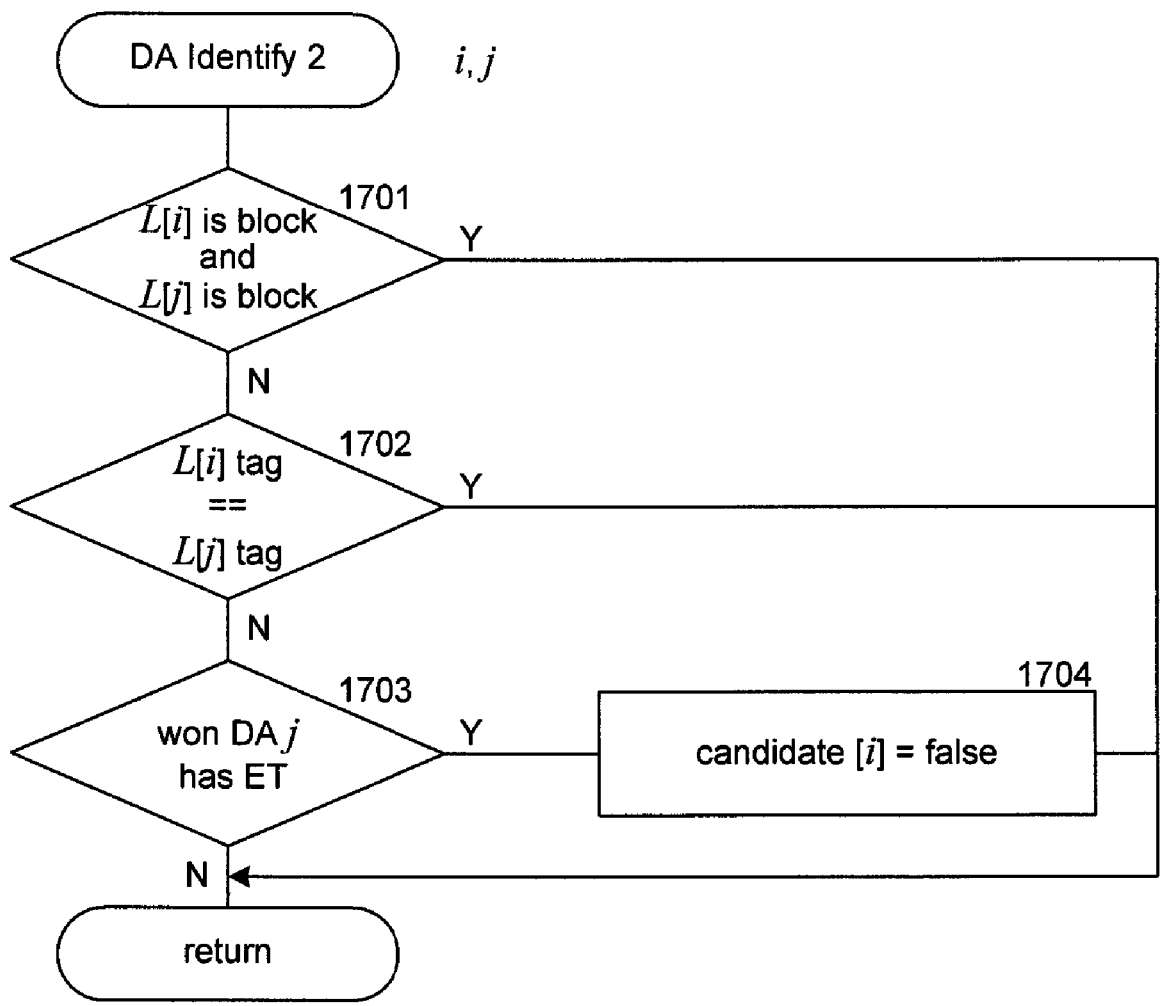
FIG. 17 is a flow diagram that illustrates the processing of the DA identify2 component of the AET system in one embodiment.

FIG. 17 is a flow diagram that illustrates the processing of the DA identify2 component of the AET system in one embodiment. The component applies criterion 2 to determine whether one or both of a pair of nodes can be eliminated as a candidate for a dominant anchor. In decision block 1701, if both nodes are block nodes, then the component returns, else the component continues at block 1702. In block 1702, if both nodes have the same tag string, then the component returns, else the component continues at block 1703. In decision block 1703, if the node that does not have a dominant anchor has explanatory text, then the component eliminates the other node as a candidate in block 1704. The component then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computing device with a computer-readable storage medium with instructions for identifying explanatory text for a display page, the computer-readable storage medium comprising:
   a find repeated patterns component that identifies repeated patterns of elements within a display page by comparing elements of the display page to other elements of the display page, a repeated pattern having an anchor along with text associated, the anchor being an element that includes a reference to a referenced display page, wherein patterns of elements are considered to be repeated when the patterns have the same number of elements and the patterns have an edit distance that is within a threshold;
   a find dominant anchor component that finds a dominant anchor within a repeated pattern by
      when the repeated pattern includes multiple anchors,
         when only one anchor of the repeated pattern contains a block element and has text associated with the anchor, designating that anchor as the dominant anchor; and
         when more than one anchor of the repeated pattern contains a block element and has text associated with the anchor, designating no anchor as the dominant anchor;
   an extract text component that extracts from a repeated pattern the text associated with the dominant anchor, wherein the extracted text represents explanatory text for the referenced display page; and wherein
   a summarization component generates a summary of a display page from the explanatory text extracted by the extract text component.

2. The computing device of claim 1 wherein a display page is represented as a tag tree with nodes representing elements and the find repeated patterns component identifies a reference explanatory text node as a collection of adjacent, sibling nodes with a subtree of one node containing a reference node with associated text.

3. The computing device of claim 2 wherein the find repeated patterns component identifies a reference explanatory text region as a collection of adjacent, sibling reference explanatory text nodes that have the same length and are similar.

4. The computing device of claim 3 wherein the reference explanatory text nodes are similar when they are within a threshold edit distance.

5. The computing device of claim 4 wherein the threshold edit distance varies based on the number of block nodes within the reference explanatory text nodes.

6. The computing device of claim 2 wherein the extract text component identifies a dominant reference node for each reference explanatory text node.

7. The computing device of claim 6 wherein a reference explanatory text node has a dominant reference node when it has only one reference node that is a block node with a unique subtree structure.

8. The computing device of claim 6 wherein the extract text component extracts explanatory text associated with a reference in a dominant reference node.

9. The computing device of claim 1 wherein a display page is represented as a tag tree with nodes representing elements and the find repeated patterns component identifies a reference explanatory text node as a collection of adjacent, sibling nodes with a subtree of one node containing a reference node with associated text and identifies a reference explanatory text region as a collection of adjacent, sibling reference explanatory text nodes that have the same length and are within a threshold edit distance that varies based on the number of block nodes within the reference explanatory text nodes.

10. The computing device of claim 9 wherein the extract text component identifies a dominant reference node for each reference explanatory text node as its only reference node that is a block node with a unique subtree structure and extracts text associated with a reference in a dominant reference node as explanatory text.

11. A method performed by a computer executing instructions of a computer program for identifying explanatory text for a display page, the method comprising:
  identifying repeated patterns of elements within a display page by comparing elements of the display page to other elements of the display page, a repeated pattern having an anchor along with text associated, the anchor being an element that includes a reference to a referenced display page, wherein patterns of elements are considered to be repeated when the patterns have the same number of elements and the patterns have an edit distance that is within a threshold;
  finding a dominant anchor within a repeated pattern by
    when the repeated pattern includes multiple anchors,
      when only one anchor of the repeated pattern contains a block element and has text associated with the anchor, designating that anchor as the dominant anchor; and
      when more than one anchor of the repeated pattern contains a block element and has text associated with the anchor, designating no anchor as the dominant anchor;
  extracting from a repeated pattern the text associated with the dominant anchor, wherein the extracted text represents explanatory text for the referenced display page; and
  generating a summary of a display page based on the extracted explanatory text.

12. The method of claim 11 wherein a display page is represented as a tag tree with nodes representing elements and the identifying of repeated patterns identifies a reference explanatory text node as a collection of adjacent, sibling nodes with a subtree of one node containing a reference node with associated text.

13. The method of claim 12 wherein the identifying of repeated patterns identifies a reference explanatory text region as a collection of adjacent, sibling reference explanatory text nodes that have the same length and are similar.

14. The method of claim 13 wherein the reference explanatory text nodes are similar when they are within a threshold edit distance.

15. The method of claim 14 wherein the threshold edit distance varies based on the number of block nodes within the reference explanatory text nodes.

16. The method of claim 12 wherein the extracting of text identifies a dominant reference node for each reference explanatory text node.

17. The method of claim 16 wherein a reference explanatory text node has a dominant reference node when it has only one reference node that is a block node with a unique subtree structure.

18. The method of claim 16 wherein the extracting of text extracts explanatory text associated with a reference in a dominant reference node.

19. The method of claim 11 wherein a display page is represented as a tag tree with nodes representing elements and the identifying of repeated patterns identifies a reference explanatory text node as a collection of adjacent, sibling nodes with a subtree of one node containing a reference node with associated text and identifies a reference explanatory text region as a collection of adjacent, sibling reference explanatory text nodes that have the same length and are within a threshold edit distance that varies based on the number of block nodes within the reference explanatory text nodes.

20. The method of claim 19 wherein the extracting of text identifies a dominant reference node for each reference explanatory text node as its only reference node that is a block node with a unique subtree structure and extracts text associated with a reference in a dominant reference node as explanatory text.

* * * * *

UNITED STATES PATENT AND TRADEMARK OFFICE
CERTIFICATE OF CORRECTION

PATENT NO. : 7,627,571 B2 Page 1 of 1
APPLICATION NO. : 11/278289
DATED : December 1, 2009
INVENTOR(S) : Jing et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 278 days.

Signed and Sealed this

Second Day of November, 2010

David J. Kappos
*Director of the United States Patent and Trademark Office*